United States Patent
Krinitchko (10) Patent No.: US 11,786,067 B2
(45) Date of Patent: *Oct. 17, 2023

(54) MACHINE FOR BREWING TEA (71) Applicant: Bogdan Krinitchko, Zürich (CH)

(72) Inventor: Bogdan Krinitchko, Zürich (CH)

( * ) Notice: Subject to any disclaimer, the term of this patent is extended or adjusted under 35 U.S.C. 154(b) by 39 days.

This patent is subject to a terminal disclaimer.

(21) Appl. No.: 17/222,913

(22) Filed: Apr. 5, 2021

(65) Prior Publication Data

US 2021/0219767 A1   Jul. 22, 2021

Related U.S. Application Data (63) Continuation of application No. 15/462,894, filed on Mar. 19, 2017, now Pat. No. 10,966,562, which is a
(Continued)

(30) Foreign Application Priority Data

Sep. 19, 2014 (CH) .................................. 01419/14
Jul. 3, 2015 (CH) .................................. 0966/15

(51) Int. Cl.
*A47J 31/057* (2006.01)
*A47J 31/06* (2006.01)
*A23F 3/18* (2006.01)

(52) U.S. Cl.
CPC ............. *A47J 31/057* (2013.01); *A23F 3/18* (2013.01); *A47J 31/0615* (2013.01)

(58) Field of Classification Search
CPC ........ A47J 31/057; A47J 31/0615; A23F 3/18
See application file for complete search history.

(56) References Cited

U.S. PATENT DOCUMENTS 3,197,173 A   7/1965   Taubenheim
3,596,588 A   8/1971   Moss
(Continued)

FOREIGN PATENT DOCUMENTS

DE          4426983       2/1996
DE        102005048765    4/2007
(Continued)

OTHER PUBLICATIONS

English Translation for DE102005048765 published Apr. 2007.
(Continued)

*Primary Examiner* — Anthony J Weier (57) ABSTRACT

A machine for the preparation of tea includes a housing; a brewing container; a water permeable, refillable infusing sieve receivable within the brewing container and adapted to receive one or more tea bags, tea leaves, or tea powder; a water container or a tap water connection; a pump adapted to pump water; a heating system adapted to heat the brewing container or the water being pumped; a drain adapted to discharge prepared tea from the brewing container into a beverage container, and an electrically actuatable drain valve moveable from an open state to a closed state, wherein in the closed state the drain valve prevents the flow of tea therethrough; a water outlet adapted to deliver water to the brewing container; a control panel configured to receive tea preparation information; and a control unit configured to control the pump, the heating system, and the drain valve so that the amount of water, the water temperature, and the amount of time the water is in the brewing container can be adjusted in response to the tea preparation information.

20 Claims, 7 Drawing Sheets

Related U.S. Application Data continuation-in-part of application No. PCT/EP2015/070693, filed on Sep. 10, 2015.

(56) References Cited

U.S. PATENT DOCUMENTS

| | | | |
|---|---|---|---|
| 3,827,467 A | 8/1974 | Henley | |
| 4,220,673 A | 9/1980 | Strobel | |
| 4,653,389 A | 3/1987 | Hayes | |
| 4,682,537 A | 7/1987 | Snowball | |
| 4,841,849 A | 6/1989 | Shimomura | |
| 5,197,373 A | 3/1993 | De Jong | |
| 5,669,287 A | 9/1997 | Jefferson | |
| 5,687,637 A | 11/1997 | Brookshire | |
| 6,095,031 A | 8/2000 | Wayne | |
| 6,405,637 B1 | 6/2002 | Cai | |
| 6,964,222 B1* | 11/2005 | Tucker | A47J 31/0621 99/323 |
| 8,663,724 B1* | 3/2014 | Banasik | A47J 31/02 426/433 |
| 10,506,893 B2* | 12/2019 | Thakkar | A23F 3/18 |
| 10,966,562 B2* | 4/2021 | Krinitchko | A47J 31/057 |
| 2005/0051033 A1* | 3/2005 | Lassota | A47J 31/08 99/283 |
| 2006/0037482 A1 | 2/2006 | Maver | |
| 2008/0216667 A1 | 9/2008 | Garman | |
| 2008/0282897 A1 | 11/2008 | Webster et al. | |
| 2009/0114099 A1 | 5/2009 | Gotlenboth | |
| 2010/0107887 A1 | 5/2010 | Bentley | |
| 2010/0125362 A1 | 5/2010 | Canora | |
| 2010/0239734 A1 | 9/2010 | Yoakim | |
| 2012/0067221 A1 | 3/2012 | Krul | |
| 2012/0156336 A1* | 6/2012 | Hansen | A47J 31/407 99/283 |
| 2012/0156339 A1 | 6/2012 | Studor | |
| 2014/0081777 A1 | 3/2014 | Mastrodonato | |
| 2015/0201790 A1 | 7/2015 | Smith | |
| 2015/0201791 A1 | 7/2015 | Tinkler | |
| 2015/0257587 A1 | 9/2015 | Dyavarasegowda | |
| 2015/0305544 A1 | 10/2015 | Lancey | |
| 2015/0305551 A1 | 10/2015 | Rosati | |
| 2016/0316962 A1 | 11/2016 | Thakkar | |
| 2017/0172340 A1 | 6/2017 | Baarman | |

FOREIGN PATENT DOCUMENTS

| | | |
|---|---|---|
| DE | 602005004441 | 1/2009 |
| EP | 0730425 | 5/1999 |
| EP | 1808110 | 7/2007 |
| EP | 2279683 | 2/2011 |
| GB | 221264 | 9/1924 |
| GB | 2442066 | 3/2008 |
| WO | WO 9934716 | 7/1999 |
| WO | WO 2011089049 | 7/2011 |

OTHER PUBLICATIONS

International Search Report PCT/ISA/210 for International Application No. PCT/EP2015/070693 dated Nov. 4, 2015.

Written Opinion of the International Searching Authority PCT/ISA/237 for International Application No. PCT/EP2015/070693 dated Nov. 4, 2015.

* cited by examiner

MACHINE FOR BREWING TEA

CROSS-REFERENCE TO RELATED APPLICATIONS

This application is a continuation of U.S. patent application Ser. No. 15/462,894 filed on Mar. 19, 2017, which is a continuation-in-part of International Application No. PCT/EP2015/070693, filed Sep. 10, 2015, which claims the benefit of both Swiss Patent Application No. CH 01419/14 filed Sep. 19, 2014, and Swiss Patent Application No. CH 0966/15 filed Jul. 3, 2015, all of which are incorporated herein by reference in their entirety.

BACKGROUND

In general, a tea bag or tea powder placed in a sieve container is immersed in hot water or hot water is poured over the tea bag or tea powder for the preparation of a cup of tea and after a certain brewing time the tea as a beverage is ready for serving and drinking. During this preparation an unnecessary amount of electrical energy is consumed, as often more water than the required amount for a cup of tea is heated and the preparation of tea is often associated with sophisticated handling operation: firstly, water has to be poured into a container in which it is heated, thereafter the heated water has to be added to the tea which is contained in a tea bag, which is contained in a cooking vessel and subsequently, after the tea preparation is completed, the tea bag has to be removed from the cooking vessel. Only then, the tea can be consumed as a beverage.

Machines for brewing tea also exist. These heat the water until the boiling point in a container and the generated vapor passes into a steeping vessel, in which the tea is contained in a permeable capsule. This mode of tea preparation differs from the classical mode of preparation because the brewing time of the tea is limited and the tea is discharged directly into a beverage container.

This automatic preparation often doesn't correspond to the "classical mode of tea preparation" as the tea is left only a limited amount of time for brewing or steeping. Thereby a loss of taste results. Too much electrical energy is consumed unnecessarily due to the fact that all machines which contain a heater or are disposed to heat a predetermined amount of water in the shortest possible time contain a heating element which is continuously maintained at an elevated temperature to minimize the temperature difference between the initial temperature and the required final temperature of the water. The permanent tempering of the heating element results in the consumption of an unnecessarily high standby current. The known tea brewing devices are configured such that the user has to be physically present to operate the device directly.

SUMMARY

This invention relates to a machine, which is used to automatically transform tea from its original state, that means from tea powder, tea leaves or tea bags into a tea beverage, whereby the tea is brewed and it is discharged after the brewing process into a suitable container, for instance in a tea cup. The parameters of the brewing process can be chosen and set individually on a control panel or by an app for a smartphone.

It is an object of this invention to provide a machine for the preparation of tea which requires only a minimal electrical energy supply and no handling which simplifies the process of preparation to the highest possible degree and also optimizes the duration of the tea preparation process. The machine shall deliver tea in a high quality, equivalent to the quality of classical mode of preparation. The machine shall be remotely controllable from any arbitrary location.

The object is resolved by a machine for the preparation of tea. Advantageous configurations and variants of the invention are subject of the dependent claims. It is advantageous if an interface, such as a radio communication interface with corresponding antenna is available for communication of the control unit with a smartphone via an established communication standard, such as WIFI, Bluetooth or a computer or laptop via the internet, whereby the machine is remotely controllable.

A particularly advantageous configuration of the invention implies that the machine is configured such that the specific brew temperature and brew duration for a plurality of different modes for different tea species is attributable via the control panel or smartphone in the control unit and selectable individually on the control panel or the smartphone.

The typical use of the machine can be described as follows: in a first step the tea, e.g. a tea powder or a tea bag, is placed into the machine or directly into the brewing container. In a subsequent step, a preparation routine is started which is selected by the user directly on the machine or remotely controlled by his smartphone. After the completion of the selected preparation routine by the machine, the prepared tea is discharged automatically into a suitable beverage container. The advantage of the invention resides additionally in the fact that the user, after having placed the tea into the machine and having started the preparation routine, is not required to take care of the preparation and the serving of the tea anymore. The tea is after preparation ready for consumption in the cup.

A first aspect of the invention relates to a system for the preparation of team, the system comprising the tea preparation machine as described herein and a mobile communication device, wherein:

the tea preparation machine is configured to receive a command signal from a mobile communication device; and the mobile communication device comprises a mobile application stored in computer storage, the mobile application comprising executable instructions that direct the mobile communications device to transmit routine instructions by way of a command signal to the tea preparation machine.

The tea preparation device can be a machine for preparing tea as described herein. The tea preparation device can have a user interface or control panel configured to receive routine is information, such as from a user, by way of a keyboard, keypad, touch pad, touch screen, microphone, movement sensor, gesture sensor, camera, rotary switches, knobs, or the like. The user interface can have a display/monitor of any type (LED, LCD, OLED, Plasma, CRT, or the like) and/or sound generators, such as speakers. The routine information can be information related to the process for the preparation of tea, or the preparation routine, for example, without limitation the required amount of water, the infusion temperature of the water and the infusion time or preparation time or brewing time.

The mobile communication device can be a wireless device being battery powered and adapted to perform wireless communication. The mobile communication device can be a pad computer, such as an Pad, or a smartphone, such as an iPhone. The mobile communication device may be a personal computer, such as a lap top, an electronic reader, an iPod Touch, or the like. The mobile communication device can have a user interface configured to receive instructions, such as from a user, by way of a keyboard, keypad, touch pad, microphone, movement sensor, gesture sensor, camera, or the like. The user interface can have a display/monitor of any type (LED, LCD, OLED, Plasma, CRT, or the like) and/or sound generators, such as speakers.

The mobile communication device can have a processor configured to determine the instructions to be transmitted. The processor can be an FPGA, ASIC, microchip, hardwired circuit, software controlled processor, DSP, or the like, which can be a monolithic unit or a distributed system.

The tea preparation machine is configured to receive a command signal, such as from a mobile communication device. The command signal can have routine instructions with information related to the preparation routine, for example, without limitation, the amount of water, the infusion temperature of the water, the infusion time, preparation time, brewing time, the type of tea, pictures of tea species such as tea species packaging, or the like. The routine instructions can render the tea preparation machine able to prepare tea.

The mobile communication device is configured to transmit a command signal to the tea preparation machine.

The mobile application is configured to transmit content identification instructions to the tea preparation machine. As used herein, the mobile application may be referred to as a software application or content "App."

The tea preparation machine and the mobile communication device can have receivers and/or transmitters. The receivers can be configured to receive instructions from the corresponding device, such as the mobile communication device. The transmitters can be configured to transmit instructions from the corresponding device, such as the mobile communication device, and thus allows a user to send instructions from the corresponding device. The receivers and/or transmitters, and the devices corresponding thereto, can be configured to communicate over a wired connection or over a wireless connection, such as via Ethernet, LAN, WAN, Bluetooth, WiFi, IR communication, or the like.

Another aspect of the invention relates to a method for preparing tea, the method comprising:
  by a tea preparation machine as described herein: receiving a command signal from a mobile communication device; and
  by execution of a mobile application on a mobile communication device: transmitting routine instructions by way of a command signal to the tea preparation machine.

BRIEF DESCRIPTION OF THE DRAWINGS

The machine is shown in an advantageous configuration in the drawings and is described and explained in detail in the subsequent description.

It is shown in.

DETAILED DESCRIPTION

Figure 1:
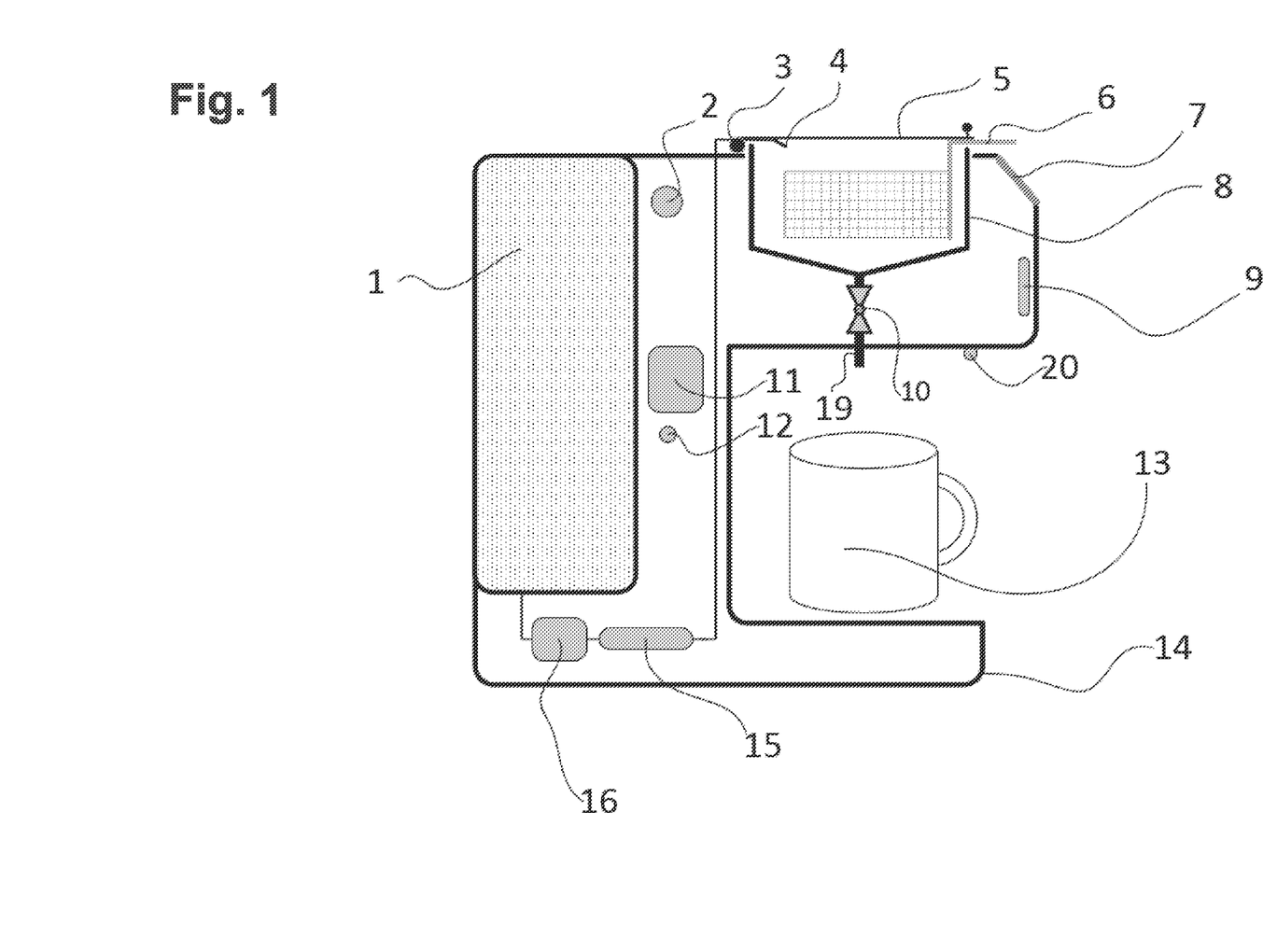
FIG. 1: a sectional view through the interior of the machine showing all required components.

The machine is shown in FIG. 1 in a sectional view. The housing 14 of the machine can have variable design or material depending on the production series. The housing 14 comprises a control panel 7, consisting of a touch screen or conventional rotary switches or knobs, by which the user can choose the desired preparation routine. The control panel 7 shows the user the required parameters for the infusing process, the process for the preparation of tea, also referred to as the preparation routine. Default values are registered for any parameters which the user can set or program according to his taste. These include: the required amount of water, the infusion temperature of the water and the infusion time or preparation time or brewing time. The machine includes a programmable and storable control unit 11 containing a microchip, which controls and supervises all processes. The user has the following possibilities to choose his settings:

1. directly on the machine by means of the control panel 7, 2. by means of his smart phone or a suitable application software or by means of a computer, which connects via a radio connection with the machine or by means of the antenna 9 belonging to the machine.

After the user has set and started the desired preparation routine, the water contained in the water container 1 for the tea preparation is transported by means of pump 16, advantageously a vibrating armature pump, through the heating system 15, where it is heated up to the set temperature and transferred thereafter into the brewing container 8.

All processes are controlled by a central programmable and storable control unit. According to a variant, the housing 14 can include a water supply stub to connect a hose from the water supply net as well as a solenoid valve for opening and closing the supply of water electromagnetically for the controlled supply of water to the brewing container 8. Furthermore, the manipulation can be performed by operation knobs, such as pressure switches and rotary switches instead of the control panel 7.

As shown in FIG. 1, the brewing container 8 contains an infusing sieve 6 in the configuration of a water permeable recipient, which receives the tea or tea bag and the brewing container 8 can be closed by a lid 5, which is attached to the housing 14 by a hinge 3 to prevent contaminations and deposits of dust during an inoperative state. The brewing container 8 is disposed with a drain stub 19 with a drain valve 10. A beverage container 13 can be placed onto the housing 14 under the drain stub 19 as shown in FIG. 1. The brewing container 8 can be easily extracted for cleaning. The lid 5 serves as a protection device during the preparation process of the tea to protect the user from burns. In the event, that the machine tilts during the preparation process, the lid 5 prevents the water from pouring out instantly. The lid 5 is disposed with a latch which ensures that the lid only opens according to the desire of the user. The lid 5 contains a water outlet 4 with a built-in temperature sensor 24 which controls the water temperature. A portion of the water temperature control is the pressure sensor 12, which controls the barometric pressure to ensure that the water is not heated above the boiling point. Furthermore, a sound or signal module 2 is provided on the housing 14 to indicate to the user, that the tea is ready for consumption. The housing 14 is also equipped with a camera 20 for taking pictures of different tea packages as explained below and it is equipped with an antenna 9.

Figure 2:
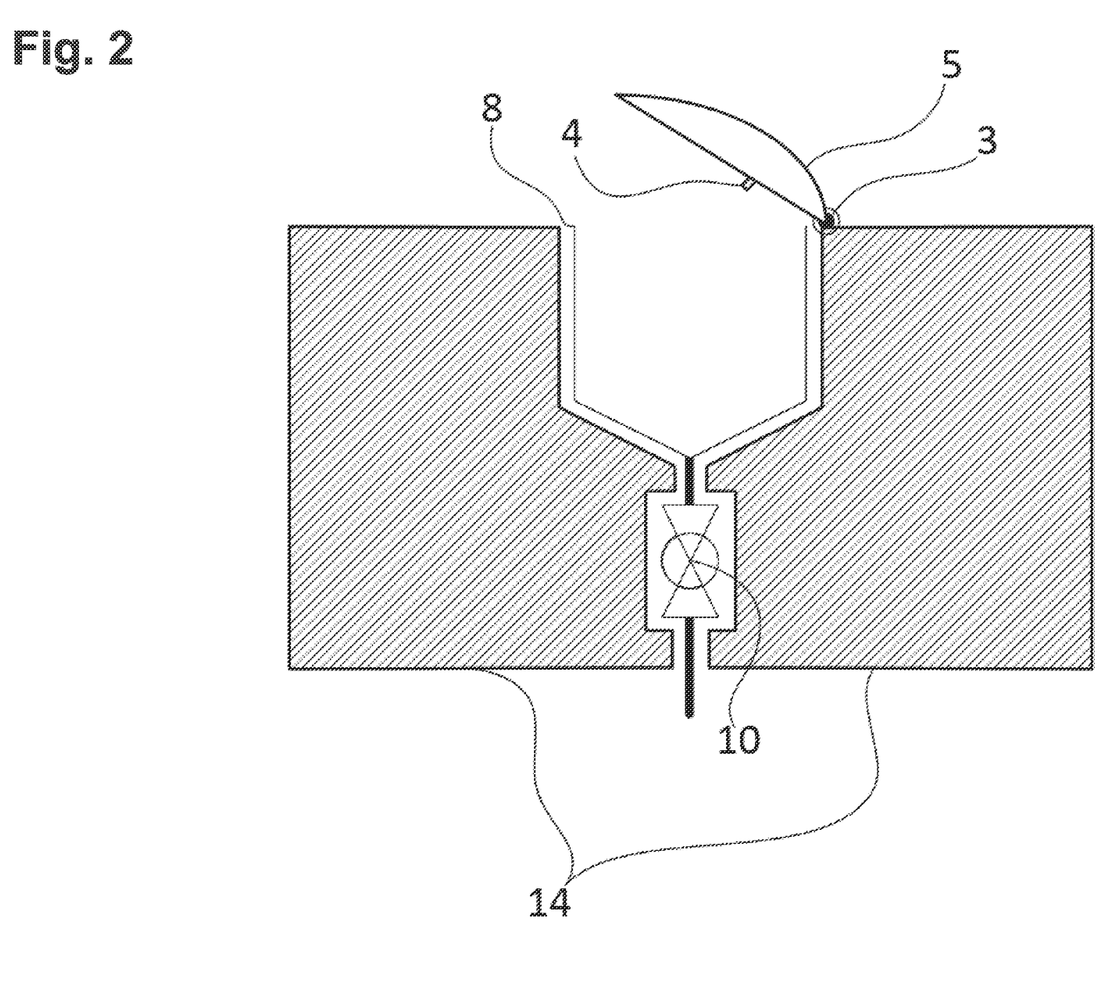
FIG. 2: a sectional view of a portion of the machine comprising the brewing container, focusing on the extractable brewing container.

The water is heated by the heating system 15 until the temperature set in the preparation routine. FIG. 2 shows the brewing container 8 in a sectional view. The temperature measurement is made by means of a temperature sensor 24 which is situated in the lid 5 of the brewing container 8 at the water outlet 4. The infusion process or preparation process or infusion method starts after the desired amount of hot water has been transferred to the brewing container 8. The amount of water is determined by a time measurement in relation to the flow rate of the pump 16 and is controlled by the programmable and storable control unit 11. The infusion process takes as much time as preset by the user in the preparation routine. The infusion time is measured by a time measurement. As soon as the infusion process has reached the duration as set out by the preparation routine, the drain valve 10 is opened electromagnetically or electrically triggered by the control unit 11 and the fully prepared tea is discharged from the drain stub 19 into a suitable beverage container 13, for instance a tea cup. The beverage container 13 is positioned under the brewing container 8 and placed on the housing 14. Due to this arrangement of brewing container 8 and beverage container 13, no further pump is required for the transfer of the tea from the brewing container 8 into the beverage container 13, which results in a further advantage of this configuration of the machine. After the tea has been completely discharged into the beverage container 13, the user is informed by an acoustic signal, which is generated by the sound or signal module 2, that the tea is in the beverage container 13 and the beverage container 13 can be removed from the machine. The entire monitoring, supervision and control is performed by a selected preparation routine by means of the control unit 11 which is selected from a plurality of specific preparation routines. For the presetting of the parameters of the desired preparation routine, a smartphone app designed specifically for the machine can be used. The smartphone is connected to the machine by an interface including an antenna 9 (FIG. 1), for instance by WIFI, Bluetooth or any other standard of a computer or laptop via internet, such that the machine is remotely controlled.

FIG. 2 shows the brewing container 8 in the interior of the machine, of which only the circumference of the housing 14 is shown. The brewing container 8 is extractable from a mount of the machine for cleaning purposes. The lower end of the brewing container 8 is disposed with a drain valve 10. The brewing container is open on the upper side and closeable by a lid 5, which is pivotable about a pivoting hinge 3 onto the edge of the brewing container 8. A water outlet with an inbuilt temperature sensor 24 passes through the lid 5.

Figure 3:
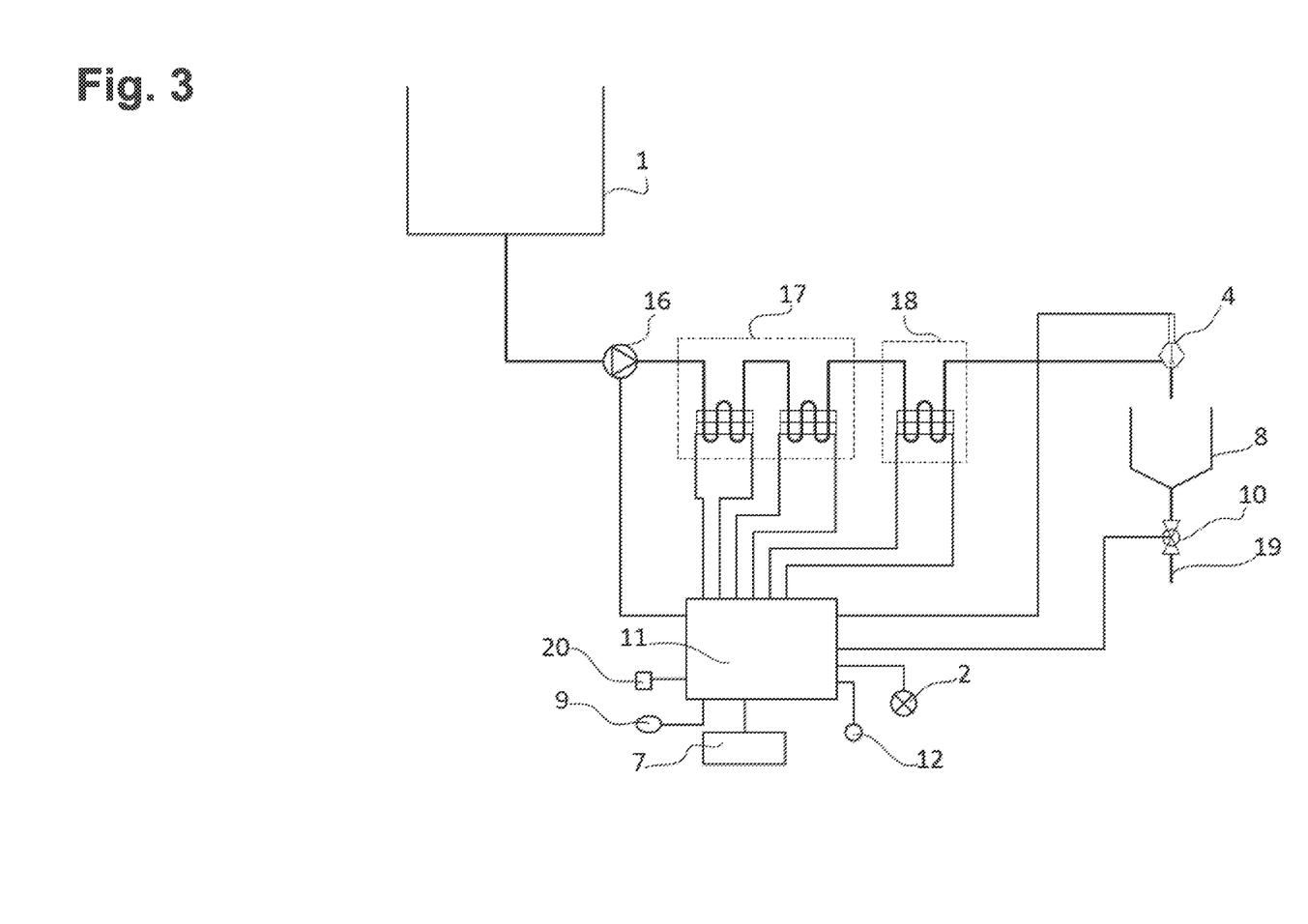
FIG. 3: a schematic view of the electrical and mechanical components focusing on the heating system.

FIG. 3 shows the particular and unique heating system 15 in a schematic representation. The heating system 15 is effective between the water container 1 and the brewing container 8. The water is pumped through the heating system by a vibrating armature pump 16. The pumped water reaches initially the preheater 17, which can include one or also two electric heaters connected in series. An additional heater 18 is arranged subsequently to this preheater 17. The preheater 17 consists of one or two heating elements arranged in series which a total power of at least 1300 to 1700 Watt. The synchronized additional heater 18 has a power of at least 900 to 500 Watt, such that a total power of at least 2200 Watt is available. This heating system 15 is controllable by the control unit 11. The vibrating armature pump 16 is also controlled by the control unit 11 with a clocking frequency of 100 ms-400 ms which can be switched on and off intermittently, such that the water can be pumped slowly and controlled through the heating elements for heating of the water passing from the water container 1 to the brewing container 8. The pressure sensor 12 serves for measurement of the atmospheric pressure. Its signals are fed into the control unit 11 and are considered by the control unit, as there is a difference if a tea is prepared at sea level or in the mountains due to the fact that the boiling point of water changes with pressure. The control unit 11 controls the different heating elements of the preheater 17 and the additional heater 18. The temperature sensor 24 senses the temperature of the water from the water container 1 heated by the heating system and supplied to the brewing container 8 directly before the discharge into the brewing container 8. The signal of the temperature sensor 24 is transferred via a cable to the control unit 11. An electrical or solenoid drain valve 10 is arranged at the lower end of the brewing container 8, such that hot water can be discharged from the brewing container 8 according to the settings of the control unit 11. The control procedure of the hot water preparation is completed as follows: initially the preheater 17 and the additional heater 18 are switched on. The vibrating armature pump 16 is switched on in the "synchronized mode" with a clocking frequency of 100 ms-400 ms. As soon as the discharged water has reached the temperature preset by the user in accordance with the measurement by the temperature sensor 24, the vibrating armature pump 16 is switched to continuous mode. Subsequently the temperature is controlled by switching the vibrating armature pump 16 between "synchronized mode" and "continuous mode". In case the temperature increases too much in "continuous mode", the additional heater 18 is synchronized with a clock frequency in the range of seconds. In case the temperature becomes too low, the preheater 17 and the additional heater 18 are switched on and the clock frequency of the vibrating armature pump 16 is decreased until the set temperature is reached. The pressure sensor 12 checks the barometric pressure and guarantees thereby that the discharging water remains in the liquid state by monitoring the boiling point of the water depending on the pressure and whereby it is ensured by the control that the boiling temperature is never reached nor exceeded.

Figure 4:
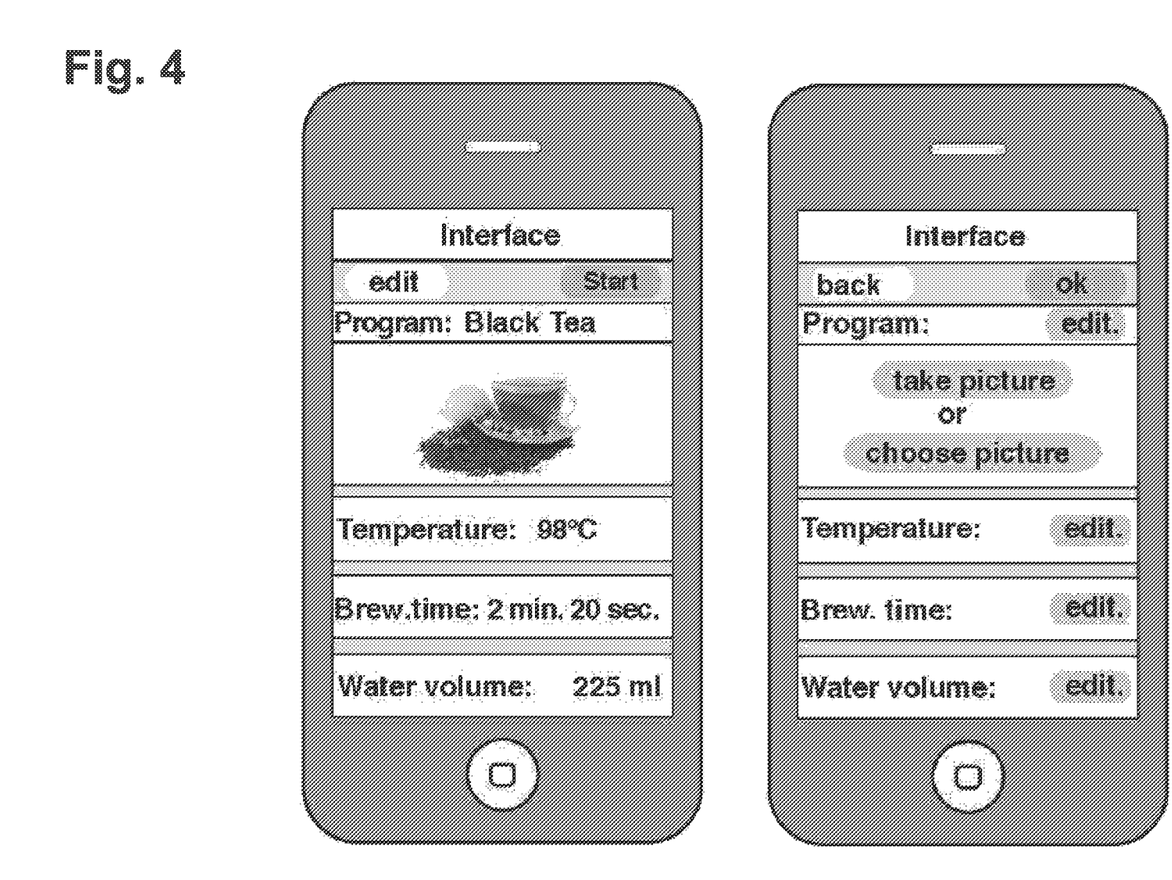
FIG. 4: three programming steps on a smartphone for the wireless control of the machine.

FIG. 4 shows an example how a smartphone app could look like by which the specific preparation routines are configured. A picture shows the tea and its species and the preparation temperature which is applied to the tea species shown on the picture. The picture is recorded by the user either with the digital camera 20 built into the machine or the camera of the smartphone.

Figure 5:
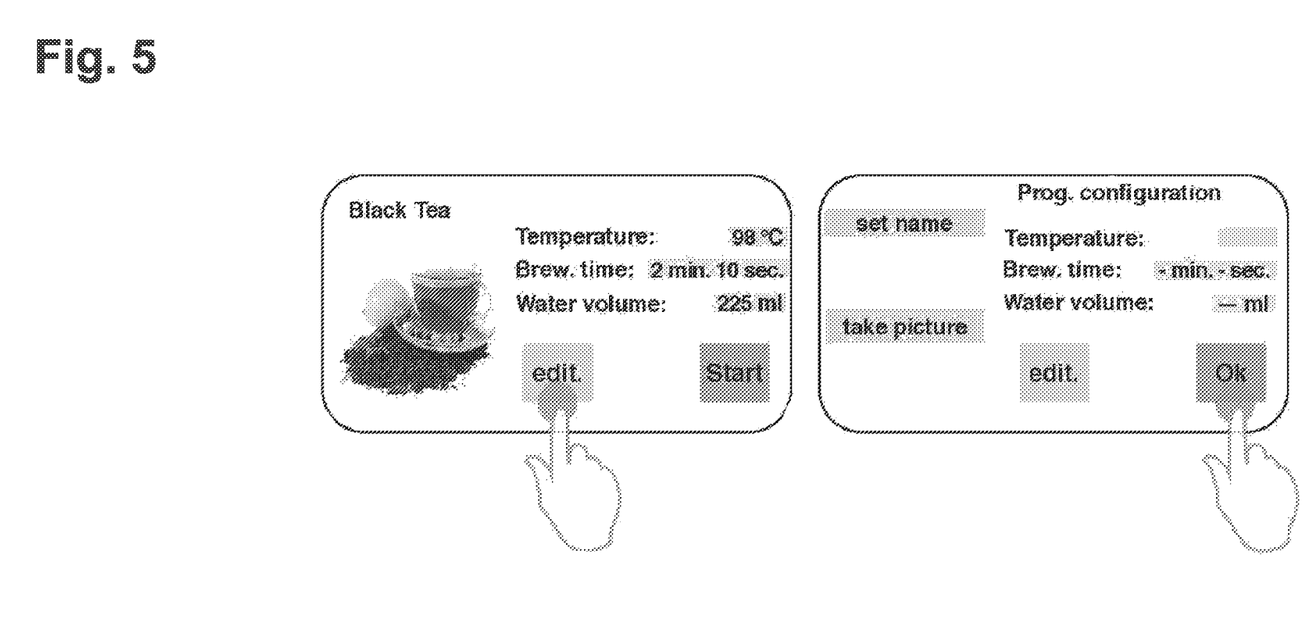
FIG. 5: three programming steps on a touchscreen of the machine.

FIG. 5 shows in the same way as the graphical representation of FIG. 4 a further example, how the user interface, namely the touch screen built into the machine can be configured in the control panel 7 so to allow a configuration of the specific preparation routines. A picture shows the tea and the preparation parameters which are applied to the tea species shown on the picture.

The individual programming allows the user to generate a plurality of preparation routines for different tea species, whereby pictures of the packaging of different tea species are taken by the inbuilt digital camera 20 or the smartphone app and then displayed on the touch screen of the machine. Thereby the choice of the desired tea preparation routine is facilitated for the user, which he has previously adapted to the different tea species. The user only needs to tip on the picture of the corresponding packaging of the tea species and the correct preparation routine is processed by the control unit 11 when started.

Figure 6:
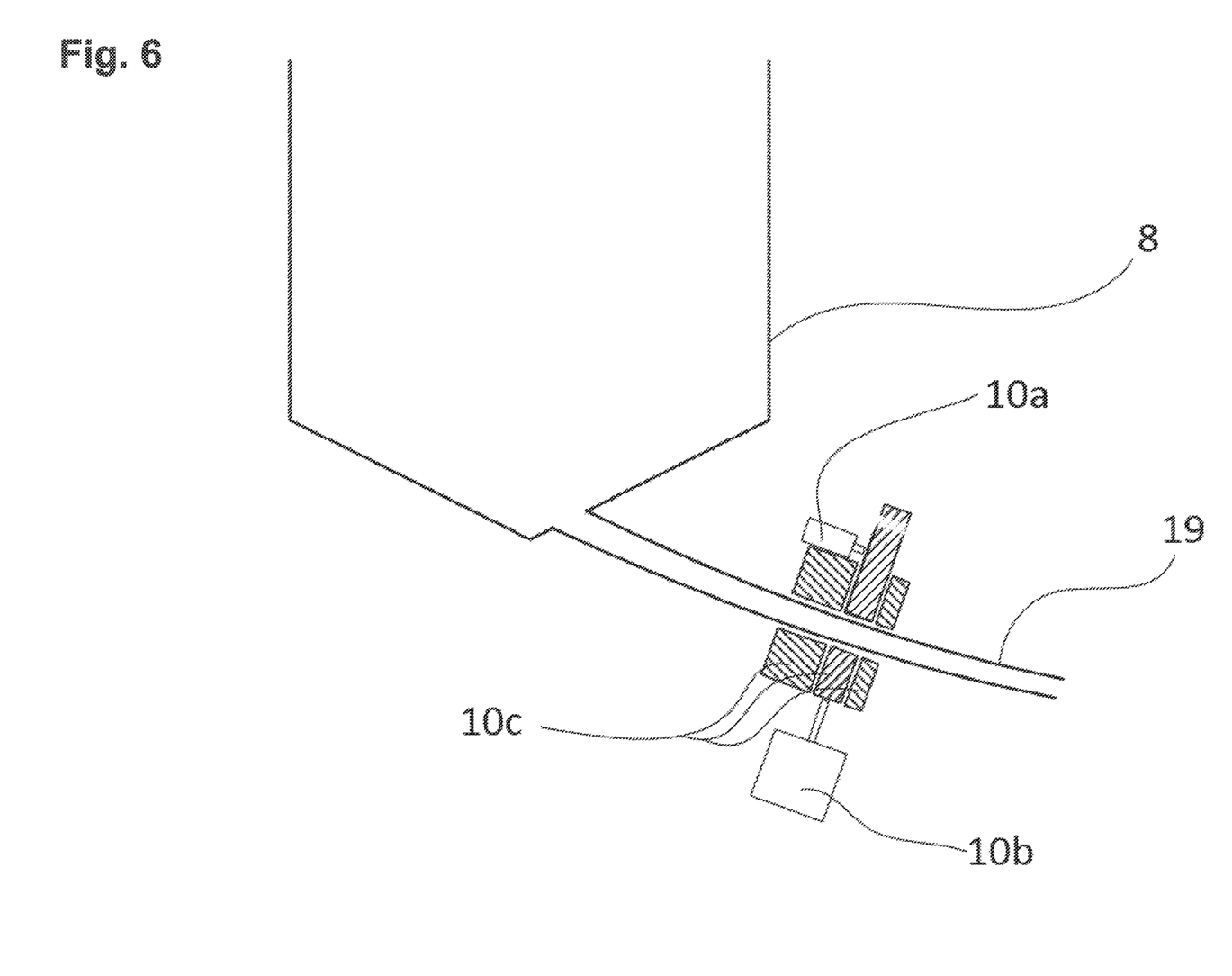
FIG. 6: A sectional view of the machine in the region of the drain valve, focusing on the sliding and locking mechanism of the valve in its open state.

FIG. 6 shows a portion of the drain valve 10 when the drain valve 10 is in the "open" state. A sliding mechanism 10c is shown, through which the drain stub 19 connected to the brewing container 8 passes after leaving the brewing container 8. There is also shown a locking slide 10a which is actuated by a solenoid and a tension slide 10b, which is also actuated by a solenoid. The valve 10 is in this state if the machine is in the standby mode or if the tea or hot water is discharged.

Figure 7:
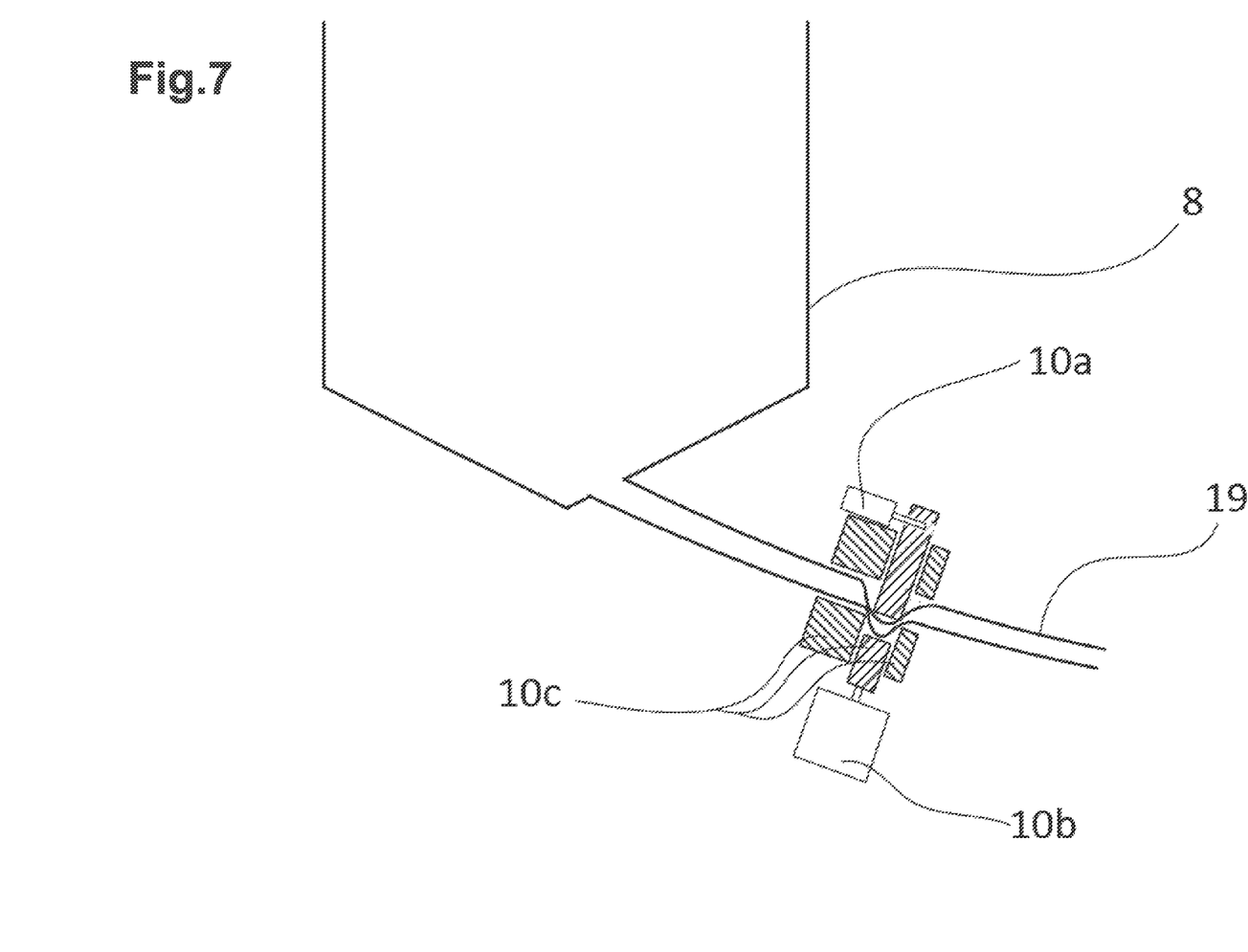
FIG. 7: The machine in a section in the region of the drain valve, focusing on the sliding and locking mechanism of the valve in its closed state.

FIG. 7 shows a portion of the drain valve 10 when the drain valve 10 is in the "closed" state. The sliding mechanism 10c is shown, through which the drain stub 19 connected to the brewing container 8 passes after leaving the brewing container 8. There is also shown the locking slide 10a with the solenoid for its actuation and the tension slide 10b, which can also be actuated by a solenoid. The valve 10 is in this state if the infusion process is performed or the brewing container 8 is filled with hot water.

Thereby the electromagnet of the tension slide 10b is activated briefly and the drain stub 19 is squeezed. As soon as the tension slide reaches its closed position, the locking slide 10a is activated by excitation of the corresponding electromagnet and the electromagnet for the tension slide 10b is switched off. This construction makes it possible to use small electromagnets and to exert a minimal thermal stress on the parts which prolongs the lifetime of the parts.

LIST OF REFERENCE NUMBERS 1 water container
2 sound or signal module
3 hinge for lid
4 water outlet in the lid
5 lid
6 infusing sieve
7 control panel
8 brewing container
9 antenna
10 drain valve
11 control unit
12 pressure sensor
13 beverage container
14 housing
15 heating system
16 vibrating armature pump
17 preheater
18 additional heater
19 drain stub
20 camera
10a solenoid, locking slide
10b solenoid, tension slide
10c sliding mechanism
24 temperature sensor

What is claimed is:

1. A machine for the preparation of tea, the machine comprising:
   a housing;
   a brewing container;
   a water permeable, refillable infusing sieve receivable within the brewing container and adapted to receive one or more tea bags, tea leaves, or tea powder;
   a water container or a tap water connection;
   a pump adapted to pump water;
   a heating system adapted to heat the brewing container or the water being pumped;
   a drain adapted to discharge prepared tea from the brewing container into a beverage container, and an electrically actuatable drain valve moveable from an open state to a closed state, wherein in the closed state the drain valve prevents the flow of tea therethrough;
   a water outlet adapted to deliver water to the brewing container;
   a control panel configured to receive tea preparation information; and
   a control unit configured to control the pump, the heating system, and the drain valve so that the amount of water, the water temperature, and the amount of time the water is in the brewing container can be adjusted in response to the tea preparation information.

2. The machine for the preparation of tea according to claim 1 wherein the control unit is configured to open and close the drain valve.

3. The machine for the preparation of tea according to claim 1, wherein the pump is configured to provide for an adjustable flow rate, and wherein the control unit is configured to turn the heating element on and off and configured to affect the flow rate of the pump.

4. The machine for the preparation of tea according to claim 1, wherein the brewing container comprises a container heating element positioned below or around the bottom of the brewing container, wherein the container heating element is configured to heat the brewing container, and wherein the control unit is configured to turn the container heating element on and off.

5. The machine for the preparation of tea according to claim 1, wherein the housing comprises a temperature sensor configured to measure water temperature, and wherein the temperature sensor is configured to transmit temperature signals to the control unit.

6. The machine for the preparation of tea according to claim 1 wherein the infusing sieve is removable from the brewing container.

7. The machine for the preparation of tea according to claim 1, wherein the housing comprises a lid, wherein the water outlet is located on the lid.

8. A system for the preparation of tea, the system comprising the machine for the preparation of tea of claim 1 and a mobile communication device, wherein:
   the tea preparation machine is configured to receive a command signal from the mobile communication device; and
   the mobile communication device comprises a mobile application stored in computer storage, the mobile application comprising executable instructions that direct the mobile communications device to transmit tea preparation instructions by way of a command signal to the tea preparation machine.

9. A machine for the preparation of tea, the machine comprising:
   a housing;
   a brewing container;
   a water permeable, refillable infusing sieve receivable within the brewing container and adapted to receive one or more tea bags, tea leaves, or tea powder;
   a water container or a tap water connection;

a pump adapted to pump water;

a heating system adapted to heat the brewing container or the water being pumped;

a drain stub adapted to discharge prepared tea from the brewing container into a beverage container, and an electrically actuatable drain valve moveable from an open state to a closed state, wherein in the closed state the drain valve prevents the flow of tea therethrough by squeezing the drain stub;

a water outlet adapted to deliver water to the brewing container;

a control panel configured to receive tea preparation information; and a control unit configured to control the drain valve so that the amount of time the water is in the brewing container can be adjusted in response to the tea preparation information.

10. The machine for the preparation of tea according to claim 9, wherein the drain valve comprises an electronically actuated tension slide and an electronically actuated locking slide, wherein the tension slide is actuated to move the drain valve from the open state to the closed state and the locking slide is actuated to maintain the drain valve in the closed state.

11. The machine for the preparation of tea according to claim 1 comprising a positioning surface adapted to receive the beverage container.

12. The machine for the preparation of tea according to claim 9 comprising a positioning surface adapted to receive the beverage container.

13. A machine for the preparation of tea, the machine comprising:
a housing;
a brewing container;
a water permeable, refillable infusing sieve receivable within the brewing container and adapted to receive one or more tea bags, tea leaves, or tea powder;
a water container or a tap water connection;
a pump adapted to pump water;
a heating system adapted to heat the water;
a drain adapted to discharge prepared tea from the brewing container into a beverage container, and an electrically actuatable drain valve moveable from an open state to a closed state, wherein in the closed state the drain valve prevents the flow of tea therethrough;
a water outlet adapted to deliver water to the brewing container;
a control panel configured to receive tea preparation information; and
a control unit configured to control the pump, the heating system, and the drain valve so that the amount of water, the water temperature, and the amount of time the water is in the brewing container can be adjusted in response to the tea preparation information.

14. The machine for the preparation of tea according to claim 13 comprising a positioning surface adapted to receive the beverage container.

15. The machine for the preparation of tea according to claim 13 wherein the heating system is adapted to heat the brewing container or the water being pumped.

16. The machine for the preparation of tea according to claim 13 wherein the control unit is configured to open and close the drain valve.

17. The machine for the preparation of tea according to claim 13, wherein the brewing container comprises a container heating element positioned below or around the bottom of the brewing container, wherein the container heating element is configured to heat the brewing container, and wherein the control unit is configured to turn the container heating element on and off.

18. The machine for the preparation of tea according to claim 13, wherein the housing comprises a temperature sensor configured to measure water temperature, and wherein the temperature sensor is configured to transmit temperature signals to the control unit.

19. The machine for the preparation of tea according to claim 1 wherein the brewing container is extractable from the housing.

20. The machine for the preparation of tea according to claim 13 wherein the brewing container is extractable from the housing.

* * * * *